INVENTORS
STIG JANSON
ULF STIG JANSON
BY
Young + Thompson
ATTY:

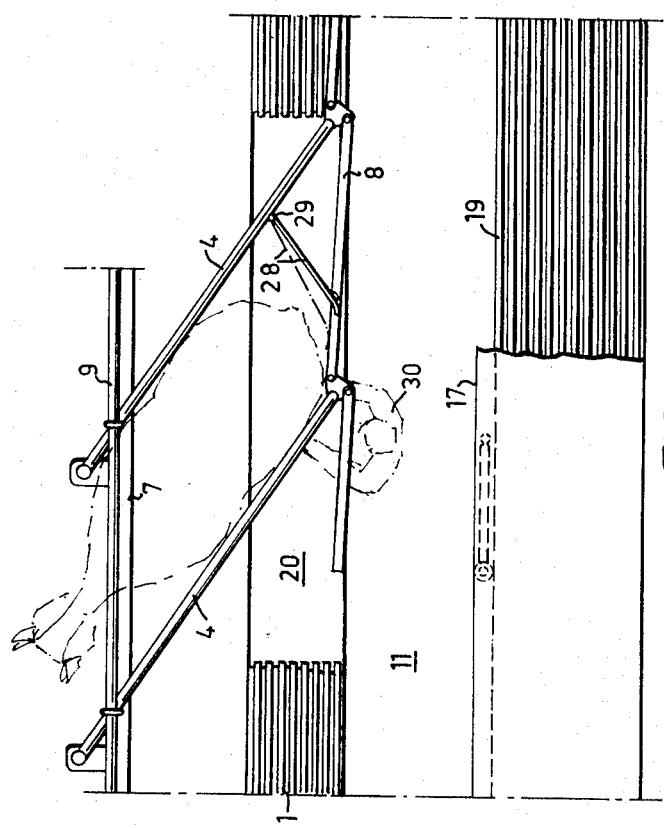
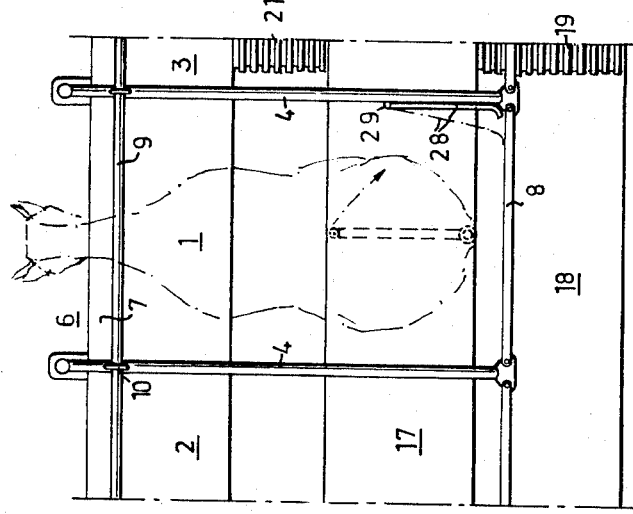

United States Patent Office 3,392,709
Patented July 16, 1968

3,392,709
STALL ARRANGEMENT FOR FACILITATING THE MILKING OPERATION IN BARNS
Stig Janson, and Ulf Stig Janson, both of Ryholms Gods, Moholm, Sweden
Filed June 6, 1966, Ser. No. 555,333
Claims priority, application Sweden, June 15, 1965, 7,891/65
9 Claims. (Cl. 119—27)

ABSTRACT OF THE DISCLOSURE

Milking stalls are defined between a plurality of upright vertically swinging gates whose freely-swinging rear ends are pivotally interconnected by a rigid link to collapse in the manner of a parallelogram linkage, thereby simultaneously forcing a cow forward and closely confining the cow during the milking operation. With the gates collapsed and the cow forced forward, a sunken alley can be uncovered to accommodate the operator at a convenient height for milking. There are manure gutters fore and aft of the operator's alley.

---

Figure 1:
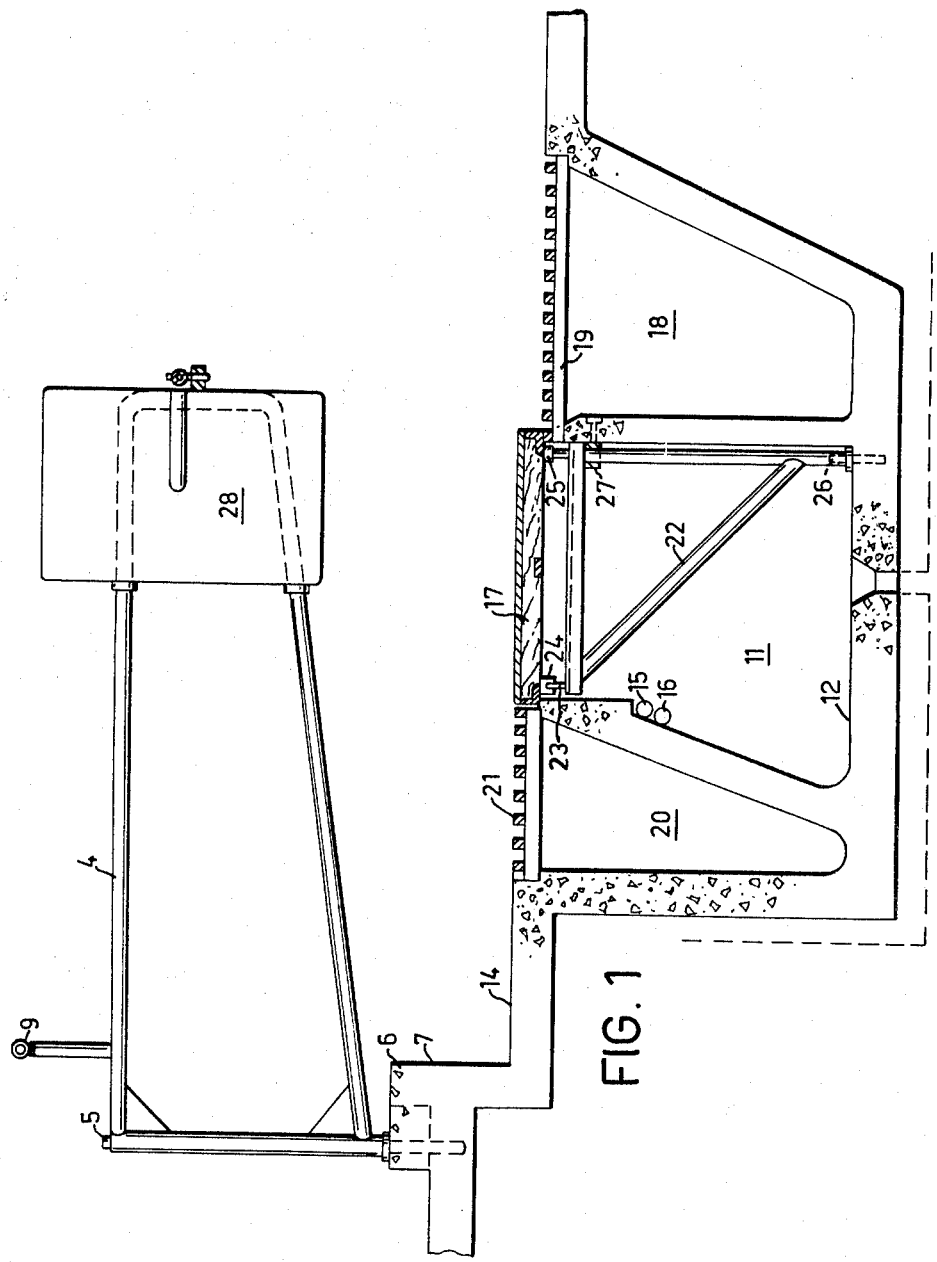

The layouts of barns or cowhouses in general use today are ordinarily made according to two different systems. According to the first one the cows are collared in stalls behind which and common to which there is a manure gutter. Then the milking operation has to be performed under unfavourable conditions with the milking operator occupying a squatting position in the stall, in the long run causing occupational diseases of which injuries to the back and to the knees are especially frequent. The other system involves the cows being kept untethered in batches or groups on a surface occupying a larger space, where the feeding is mechanized and a special milking parlour has been set up. The milking operator then occupies a position on a sunken floor in an alley below the floor where the cows stand, whereby the back and knees of the operator are less strained. The disadvantage of this system, however, is the lack of satisfactory control as it, e.g., is not certain that all of the cows will get their ration of concentrated feed generally supplied during the milking process.

The present invention intends to eliminate the inconveniences mentioned and to create a rational arrangement, which will facilitate the milking operation. The most characteristic feature of the invention is the arrangement by which the side restraining elements of the stall can be adjusted from a position where they are at right angles to the front limit or front panel of the stall, for example, constituted by the manger alley, to a position at another angle to said front limit than a right angle, thereby forcing the cows into a position oblique to the front panel of the stall which from a technical viewpoint of the milking operation is more favourable. Between the front and rear limits of the stall there may be a manipulation station at a level below that of the stall floor. The manipulation station may for example constitute a part of a sunken alley parallel to the front panel of the stall, said alley being common to the battery of stalls and preferably containing the pipelines for milking machine connection. The side limits of the stall may consist of bars serving as gates, which can pivot on upright axes and which are interconnected in a way permitting all the gate bars simultaneously to be swung from a position at right angles to the front limit of the stall into a position where the cows are forced to stand at an oblique angle to the front panel of the stall, thereby getting their teats in a more forward position. By this arrangement the teats will be easily available for the application of teat cups. If the manipulation or operator's alley is a sunken alley the teats will also be at convenient height for the milking operation.

Additional characteristics of the invention and advantages derived from the same appear in the following description of an embodiment shown on the attached drawings. FIG. 1 shows a vertical section of an arrangement made according to the invention, and FIG. 2 a part of a corresponding horizontal projection with the side restraining gates of the stall at right angles to the front limit, and FIG. 3 shows a corresponding horizontal projection with the side restraining gate bars in an oblique position.

In the drawings a stall 1 is shown and portions of a couple of stalls 2 and 3 at each side of the same. An optional number of stalls can be arranged in a row. Each stall is limited at its sides by horizontal gate bars 4 with a front tubular post mounted in swivelling fashion on an upright axis 5. The axis in question is set in a concrete base 6 on which there may be a feeding trough. The base forms a vertical wall 7, which can be considered to constitute the front limit of the stall. The rear ends of the side gate bars are coupled together with link bars 8, which can be lifted. The gate bars can also be considered to be coupled together with a neck engaging stanchion 9 situated at the front portion of the stall and passing through rings 10 mounted on the topside of the gate bars. The neck engaging stanchion 9 serves the purpose of keeping the cows in a desired position towards the front portion of the stall.

Parallel to the front panel of the stall there is a manipulation or operator's alley 11 the bottom level of which 12 is at a suitable depth below the level of the floor of the stall 14. This sunken alley is common to all stalls in one row and contains a manipulation station for each one of the stalls, where the milking operator can stand while performing his work. Tube conduits 15, 16 for connection to milking machines extend all along the alley in question. The alley 11 may be covered flush with the floor of the stall with a lid 17 conveniently dimensioned to cover the space corresponding to two or several stalls, it being possible to slide this lid backwards in order to uncover the manipulation stations when the milking operation is going to be performed. Behind the operator's alley 11 there is a manure gutter 18 covered with a grid 19. The lid 17 can be slid backwards until it will cover the manure gutter 18, this being the position it shall occupy during the milking operation. Ahead of the operator's alley 11 there is a front manure gutter 20 covered with a grid 21. The walls enclosing the gutters 18 and 20 as well as the alley 11 may be of concrete made together with the base so that they form one single unit.

The lid 17 rests on a number of swivelling brackets 22 arranged at a suitable distance between each other, each one provided with a pivot 23, engaging in a bearing 24 on the underside of the lid close to one longitudinal edge of the same, the lid resting along its other longitudinal edge upon slide-supports 25. The bracket swivels around a vertical axis defined by a pivot 26 set in the base and a top bearing 27.

At the rear end of the gates 4 there may be suspended in swinging fashion a splashguard 28 intended to prevent the manipulation station from getting dirty during the milking operation.

When the cows are resting or fed, the side-restraining gates 4 are intended to be in a position at right angles to the front wall 7 as shown in FIG. 2. The lid 17 then occupies the position shown in FIG. 1 covering the operator's alley 11. When the milking operation is about to be performed the gate bars 4 are swung into the position shown in FIG. 3, in which they are at an oblique angle to the front wall. The cows thereby will be forced to take an oblique position so that the hoofs of their hind feet will be standing ahead of or on the grid of the front manure gutter. Also the neck engaging stanchion 9 contributes to forcing the cows to occupy a forward position totally clearing off the operator's alley 11, this being caused by the parallel forward movement of the stanchion when the gate bars are swung sideways. The stanchion always will be positioned behind the neck of the cows, so that the position of the cow will be fixed also when the gate bars occupy their oblique positon. The milking operator stands at the bottom 12 of the alley 11 approximately at the position 30 in FIG. 3, whereby the teats of the cow will be readily available at a suitable height for the arms of the milking operator. If milking machines are used the application and removal of the teat cups will therefore easily be performed. By the fact that the suction tube of the milking machines is in a lowered position relative to the cows, an additional suction level is obtained, which should improve the function of the milking machines. Swinging the gate bars 4 sideways the perpendicular distance between them will be reduced, e.g. from 115 cm. to 65 cm., so that the gate bars during the milking operation will be positioned very close to the flanks of the cow. The cow then is forced to stand in a very confined position during the milking operation, which facilitates the work. Because of the fact that the cows do not stray loose immediately before and after the milking operation, a close control can be performed as to feeding and other attendance in connection with the milking operation.

If the splash guard 28 is arranged in a manner so that it can pivot around a vertical axis 29 on the gate bar 4 and be given a curved shape as shown with dashed and dotted lines in FIG. 2, it can be made to adjust itself automatically from the position shown in FIG. 2 to the protecting position according to FIG. 3 by the sliding movement of its rear edge along the link bar 8 during the swinging movement of the gates.

The movements of the gates 4 as well as of the lid 17 can be executed by hand or by mechanical means, e.g. hydraulics, motors, etc.

What we claim is:
1. Arrangement to facilitate the confinement of a cow for milking operations in cow houses or barns, comprising a plurality of gates defining between them at least one stall for a cow, means pivotally supporting the forward ends of the gates for horizontal swinging movement of the rear ends of the gates, and means pivotally interconnecting said rear ends of the gates to maintain the gates spaced apart and parallel to each other during said horizontal swinging movement, the gates forming opposite sides of parallelogram linkage defining a cow milking stall so that when the linkage is collapsed a cow between the gates will be forced into a position at an angle to its original position and be moved forward into milking position and be more closely confined between gates.

2. Arrangement as claimed in claim 1, and means defining a sunken operator's alley immediately to the rear of the forwardly moved position of the cow.

3. Arrangement as claimed in claim 2, and means defining a manure gutter to the rear of said operator's alley.

4. Arrangement as claimed in claim 3, and a removable cover for said operator's alley, said removable cover being slidable from said operator's alley over said manure gutter.

5. Arrangement as claimed in claim 3, and means defining a manure gutter in front of said operator's alley.

6. Arrangement as claimed in claim 1, said mounting means comprising means mounting said gates for horizontal swinging movement about a pair of parallel vertical axes lying in a common plane perpendicular to the lengthwise extent of said gates when said gates are spaced farthest apart.

7. Arrangement as claimed in claim 1, said interconnecting means comprising a rigid link bar.

8. Arrangement as claimed in claim 7 and a splash guard pivotally interconnected to one of said link bar and one gate, and slidably contacting the other of said link bar and one gate.

9. Arrangement as claimed in claim 1, and a stanchion extending across and interconnected with said gates whereby said stanchion moves forward when the gates are swung into an oblique position thereby to force the cow forward.

References Cited

UNITED STATES PATENTS

| | | | |
|---|---|---|---|
| 239,803 | 4/1881 | Kitsee et al. | 119—11 |
| 241,220 | 5/1881 | Illoway et al. | 119—11 |
| 283,441 | 8/1883 | Weber | 119—11 |
| 322,336 | 7/1885 | Wickes | 119—11 |
| 371,928 | 10/1887 | Davis | 119—11 |
| 502,829 | 8/1893 | Phillips | 119—27 |
| 1,910,666 | 5/1933 | Babson | 119—15 |
| 1,996,196 | 4/1935 | Ferris | 119—27 |
| 3,106,188 | 10/1963 | McMurray | 119—15 X |

FOREIGN PATENTS 175,459    5/1961    Sweden.

ALDRICH F. MEDBERY, *Primary Examiner.*